(12) United States Patent
Chen et al.

(10) Patent No.: US 10,823,702 B2
(45) Date of Patent: Nov. 3, 2020

(54) BUILT-IN S-TYPED ARRAY EDDY CURRENT TESTING PROBE AND METHOD FOR DETECTING DEFECTS OF TUBULAR STRUCTURE

(71) Applicant: XI'AN JIAOTONG UNIVERSITY, Xi'an, Shaanxi (CN)

(72) Inventors: Zhenmao Chen, Shaanxi (CN); Yingsong Zhao, Shaanxi (CN); Shejuan Xie, Shaanxi (CN); Hongen Chen, Shaanxi (CN); Xiaojie Yu, Shaanxi (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 0 days.

(21) Appl. No.: 16/634,574

(22) PCT Filed: Mar. 20, 2019

(86) PCT No.: PCT/CN2019/080689
§ 371 (c)(1),
(2) Date: Jan. 28, 2020

(87) PCT Pub. No.: WO2019/205891
PCT Pub. Date: Oct. 31, 2019

(65) Prior Publication Data
US 2020/0271622 A1     Aug. 27, 2020

(30) Foreign Application Priority Data

Apr. 27, 2018   (CN) .......................... 2018 1 0395256

(51) Int. Cl.
*G01N 27/82* (2006.01)
*G01N 27/90* (2006.01)

(52) U.S. Cl.
CPC ....... *G01N 27/9033* (2013.01); *G01N 27/904* (2013.01)

(58) Field of Classification Search
CPC ............. G01N 27/9033; G01N 27/902; G01N 27/904; G01N 27/9046; G01N 27/9086;
(Continued)

(56) References Cited

U.S. PATENT DOCUMENTS

| | | | |
|---|---|---|---|
| 5,049,817 A * | 9/1991 | Cecco | ................. G01N 27/902 324/220 |
| 5,565,633 A | 10/1996 | Wernicke | |

(Continued)

FOREIGN PATENT DOCUMENTS

| | | |
|---|---|---|
| CN | 103487503 A | 1/2014 |
| CN | 103868986 A | 6/2014 |

(Continued)

*Primary Examiner* — Thang X Le

(57) ABSTRACT

A built-in S-typed array eddy current testing probe and a method for detecting defects of a tubular structure are provided. The probe includes an exciting coil part and a plurality of pick-up coil parts, wherein: the exciting coil part includes multiple bundles of exciting coil wires helically wound on a columnar coil former with a same interval; two bundles of exciting coil wires with an interval of 180° are connected at an end of the columnar coil former, actually being a same group of exciting coil wire bundles; each pick-up coil part consists of two rows of pancake coils; each four pancake coils which are closely arranged in a square shape form one differential eddy current testing pick-up unit; a final output signal is a result of additions between signals of opposite pancake coils and subtractions between signals of adjacent pancake coils in each differential eddy current testing pick-up unit.

6 Claims, 3 Drawing Sheets

(58) Field of Classification Search
CPC ........ G01N 27/80; G01N 27/82; G01N 27/87; G01N 27/90
See application file for complete search history.

(56) References Cited

U.S. PATENT DOCUMENTS

| | | | |
|---|---|---|---|
| 2010/0085044 A1* | 4/2010 | Sawawatari | G01N 27/902 324/240 |
| 2013/0009632 A1* | 1/2013 | Yamamoto | G01N 27/9046 324/222 |
| 2013/0106409 A1* | 5/2013 | Wang | G01R 33/028 324/239 |

FOREIGN PATENT DOCUMENTS

| | | |
|---|---|---|
| CN | 105301096 A | 2/2016 |
| CN | 106645393 A | 5/2017 |
| CN | 106770636 A | 5/2017 |
| CN | 108693244 A | 10/2018 |
| CN | 109115869 A | 1/2019 |

* cited by examiner

BUILT-IN S-TYPED ARRAY EDDY CURRENT TESTING PROBE AND METHOD FOR DETECTING DEFECTS OF TUBULAR STRUCTURE

CROSS REFERENCE OF RELATED APPLICATION

This is a U.S. National Stage under 35 U.S.C. 371 of the International Application PCT/CN2019/080689, filed Mar. 30, 2019, which claims priority under 35 U.S.C. 119(a-d) to CN 201810395256.5, filed Apr. 27, 2018.

BACKGROUND OF THE PRESENT INVENTION

Field of Invention

The present invention relates to an electromagnetic nondestructive detection probe, and more particularly to a built-in S-typed array eddy current testing probe and a method for detecting defects of a tubular structure.

Description of Related Arts

The tubular structure has been widely applied in various industrial fields, such as the energy field, the machinery field and the chemical field. For example, for the steam generator tube of the nuclear steam generator, which is a pressure boundary of the nuclear reactor coolant system, due to the wall thickness of about 1 mm and the extreme operation condition, the steam generator tube becomes the weakest link in the primary pressure boundary. Because of long-term working under the extreme environment, it is inevitable that various defects are generated inside the tube. If the periodic detection is not conducted, a disastrous accident will finally happen. Thus, in order to avoid the great economic loss, it is necessary to periodically conduct the nondestructive detection and safety evaluation for the steam generator tube.

The eddy current testing technique is a nondestructive testing method established on the basis of electromagnetic induction principle, which has advantages of non-contact, no need of coupling medium, fast detection speed, easy implementation of automatic detection, and high detection sensitivity on the surface defects. For the current researches on the crack detection of the wall of the steam generator tube, the conventional adopted eddy current testing probes include the Bobbin probe, the rotating probe and the array probe. In the actual industrial production, the Bobbin probe and the rotating probe are mainly adopted. The Bobbin probe has a fast detection speed, but has a low detection accuracy and cannot detect the circumferential cracks. The rotating probe can acquire the C-scanning image of the tube wall and high-efficiently detect the features and sizes of the axial cracks and the circumferential cracks. However, the speed of the helical scanning process is slow; the probe is easy to be damaged; the mechanical system for controlling the rotary machine of the probe is complex; and the operation is easy to fail, especially for the crakes inside the tube. In order to overcome the deficiencies that the Bobbin probe has a low detection accuracy and cannot detect the circumferential cracks and the rotating probe has a slow detection speed, it is necessary to develop an array probe having advantages both of the Bobbin probe and the rotating probe.

SUMMARY OF THE PRESENT INVENTION

An object of the present invention is to provide a built-in S-typed array eddy current testing probe and a method for detecting defects of a tubular structure, so as to solve existing problems in prior art. The probe provided by the present invention is able to detect a circumferential defect and an axial defect at the same time. Compared with a conventional eddy current testing probe for the tubular structure, the present invention is able to detect defects in various directions, and has a fast detection speed and a high detection accuracy. Moreover, the present invention is able to simultaneously and effectively reduce influences of an external environment such as lift-off and probe inclination on detection results.

In order to accomplish the above object, the present invention adopts technical solutions as follows.

A built-in S-typed array eddy current testing probe for detecting defects of a tubular structure is provided, which is arranged inside a tubular structure to be detected, comprising an exciting coil part and a plurality of pick-up coil parts, wherein: the exciting coil part comprises N bundles of exciting coil wires helically wound on a same columnar coil former; on a cross section of the columnar coil former, the N bundles of exciting coil wires are distributed with a same interval; two bundles of exciting coil wires with an interval of 180° are connected at an end of the columnar coil former, actually being a same group of exciting coil wire bundles; that is to say, there are totally N/2 groups of exciting coil wire bundles; each pick-up coil part consists of two rows of pancake coils which are identical, and is distributed outside each bundle of exciting coil wires helically as a whole; two adjacent pancake coils in one row and two adjacent pancake coils in same positions of the other row form one differential eddy current testing pick-up unit; in each differential eddy current testing pick-up unit, four pancake coils are closely arranged in a square shape; during detecting, an excitation current is successively applied to the N/2 groups of exciting coil wire bundles of the exciting coil part; under each time of excitation, each differential eddy current testing pick-up unit outside a corresponding bundle of exciting coil wires successively generates a differential detecting signal, which is able to simultaneously and effectively reduce influences of an external environment such as lift-off and probe inclination on detection results, thereby achieving a relatively high detection accuracy.

Preferably, the bundle number of exciting coil wires in the exciting coil part is six; on the cross section of the columnar coil former, the six bundles of exciting coil wires are distributed with a same interval of 60°; two bundles of exciting coil wires with the interval of 180° are connected at the end of the columnar coil former, actually being the same group of exciting coil wire bundles; that is to say, there are totally three groups of exciting coil wire bundles.

Preferably, the N bundles of exciting coil wires in the exciting coil part are helically wound on the columnar coil former with a lead angle of 45°.

Preferably, the pancake coils of each pick-up coil part are distributed outside each bundle of exciting coil wires in a form of a helix with a lead angle of 45° as a whole; two pancake coils respectively in same positions of the two rows are closely arranged in a direction vertical to a tangent of the helix.

Preferably, a final output signal of each pick-up coil part is a result of additions between signals of opposite pancake coils and subtractions between signals of adjacent pancake coils in each differential eddy current testing pick-up unit.

A method for detecting defects of a tubular structure with the built-in S-typed array eddy current testing probe is provided, comprising steps of: firstly applying a steady-state sinusoidal excitation current to the exciting coil part; generating an alternating magnetic field by the steady-state sinusoidal excitation current, inducing an eddy current inside the tubular structure to be detected, and further inducing a secondary magnetic field by the eddy current; by a resultant magnetic field formed after superposing the two magnetic fields, enabling two ends of each pancake coil to generate a voltage signal; under influences of different defect forms inside the tubular structure to be detected, the induced secondary magnetic field correspondingly changing, and generating different voltage signals;

wherein: an excitation process at each detection position includes three phases, that is to say, the steady-state sinusoidal excitation current is successively applied to the N/2 groups of exciting coil wire bundles in the exciting coil part during excitation of each phase, each differential eddy current testing pick-up unit outside a corresponding bundle of exciting coil wires successively generates a differential detecting signal; during each time of working, the four pancake coils in each differential eddy current testing pick-up unit all generate detecting signals, wherein the pancake coils not at two ends of each row continuously work for two times; through a difference calculation with additions between signals of opposite pancake coils and subtractions between signals of adjacent pancake coils in each differential eddy current testing pick-up unit, a detecting signal at a center of each differential eddy current testing pick-up unit is obtained, wherein the detecting signal carries defect information and is able to simultaneously and effectively reduce interferences of an external environment such as lift-off and probe inclination;

finally, the columnar coil former moving axially along the tubular structure to be detected and driving the probe composed of the exciting coil part and the pick-up coil parts to axially scan the tubular structure to be detected; through comparing the detecting signal with a detecting signal of a non-defect tube, judging whether a defect exists in a current scanning area; if a defect signal exists, repeatedly scanning the current scanning area, and determining a position of the defect.

Compared with the prior art, the present invention has advantages as follows.

Because of shapes and arrangement ways of the exciting coil part and the pick-up coil parts, the probe provided by the present invention is able to detect a circumferential defect and an axial defect at the same time. Compared with a conventional eddy current testing probe for the tubular structure, the present invention is able to detect defects in various directions, and has a fast detection speed and a high detection accuracy. Moreover, the present invention is able to simultaneously and effectively reduce influences of an external environment such as lift-off and probe inclination on detection results.

DETAILED DESCRIPTION OF THE PREFERRED EMBODIMENT

The present invention is further illustrated in detail with the accompanying drawings and the preferred embodiment as follows.

Figure 1:
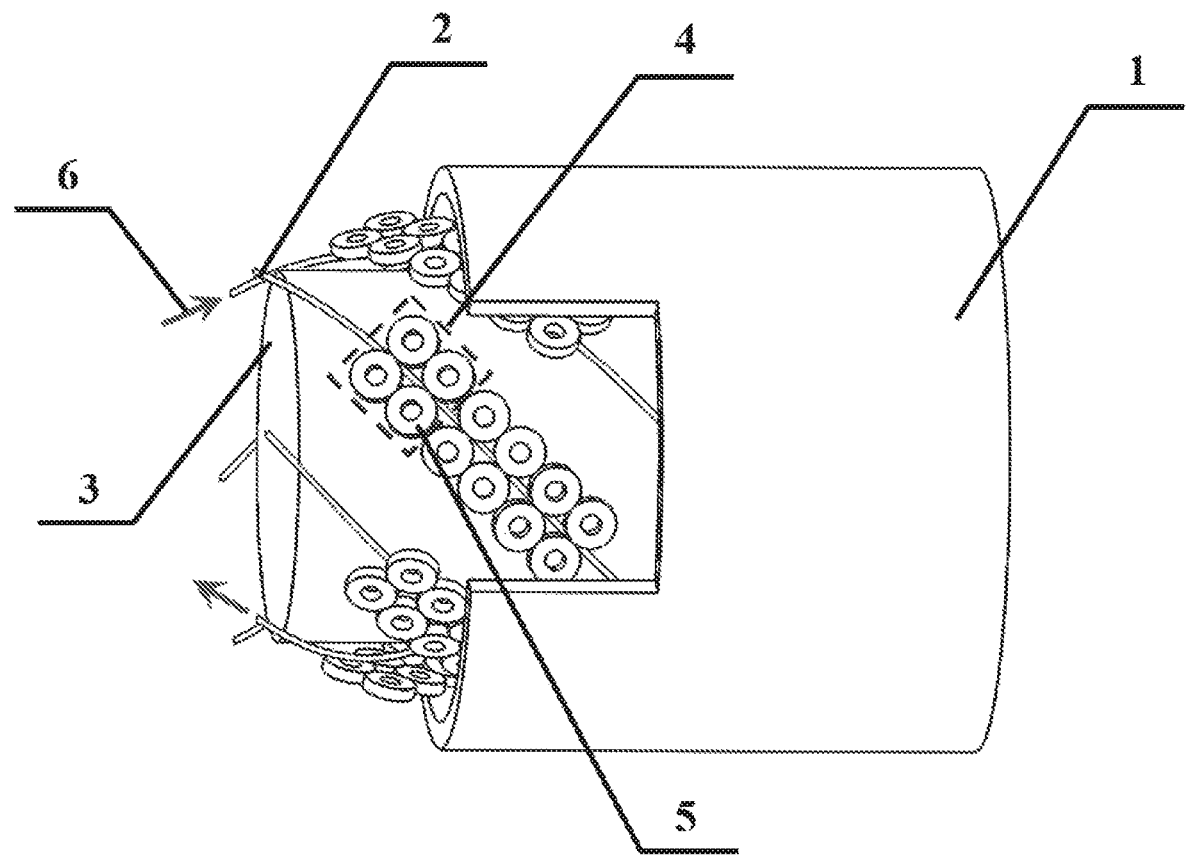
FIG. 1 is a location sketch view of a built-in array eddy current testing probe in service and a tubular structure to be detected according to the present invention.

As shown in FIG. 1, according to the preferred embodiment of the present invention, a built-in array eddy current testing probe for detecting defects of a tubular structure is provided, which is arranged inside a tubular structure 1 to be detected and named as an S-typed probe.

Figure 2:
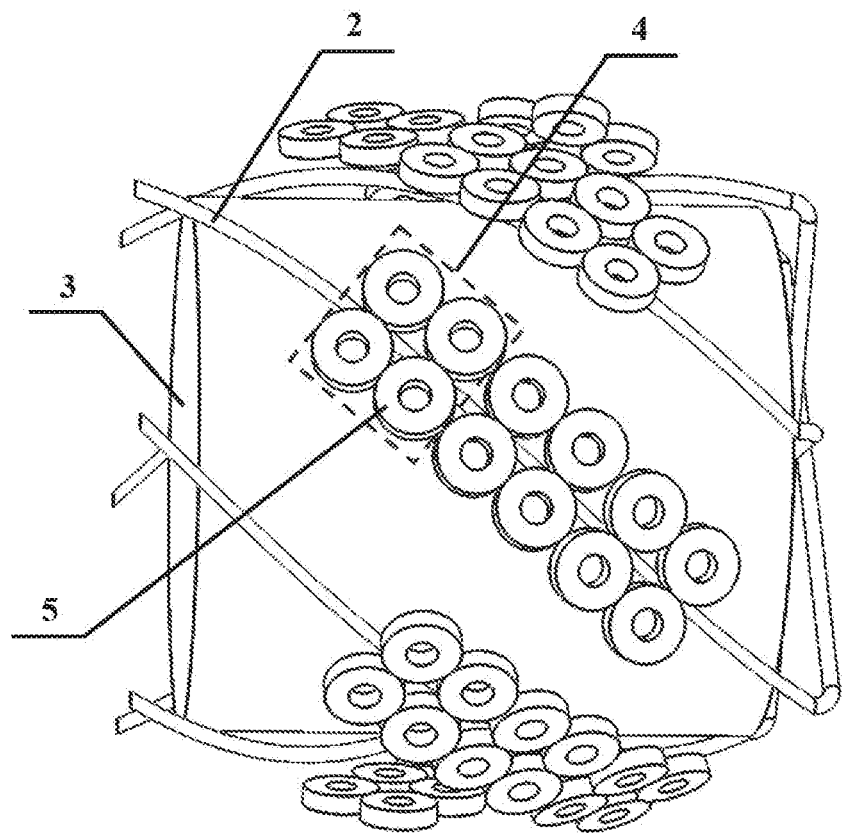
FIG. 2 is a structural sketch view of the built-in array eddy current testing probe according to the present invention.

As shown in FIG. 2, the built-in array eddy current testing probe comprises an exciting coil part and a plurality of pick-up coil parts, wherein: the exciting coil part comprises six bundles of exciting coil wires 2 helically wound on a same columnar coil former 3 with a lead angle of 45°; on a cross section of the columnar coil former 3, the six bundles of exciting coil wires 2 are distributed with a same interval of 60°; two bundles of exciting coil wires 2 with an interval of 180° are connected at an end of the columnar coil former 3, actually being a same group of exciting coil wire bundles; that is to say, there are totally three groups of exciting coil wire bundles; each pick-up coil part consists of two rows of pancake coils 5 which are identical, and is distributed outside each bundle of exciting coil wires 2 helically with a lead angle of 45° as a whole; two adjacent pancake coils 5 in one row and two adjacent pancake coils 5 in same positions of the other row form one differential eddy current testing pick-up unit 4; in each differential eddy current testing pick-up unit 4, four pancake coils 5 are closely arranged in a square shape.

Figure 3:
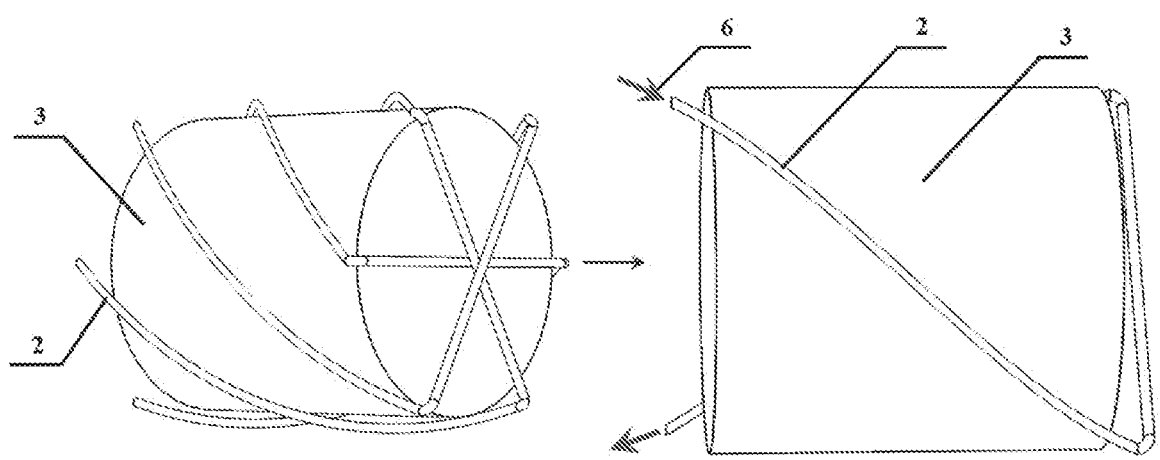
FIG. 3 is a structural sketch view of an exciting coil part according to the present invention.

As shown in FIG. 3, the exciting coil part comprises six bundles of exciting coil wires 2 helically wound on the same columnar coil former 3 with the lead angle of 45°; on the cross section of the columnar coil former 3, the six bundles of exciting coil wires 2 are distributed with the same interval of 60°; two bundles of exciting coil wires 2 with the interval of 180° are connected at the end of the columnar coil former 3, actually being the same group of exciting coil wire bundles; that is to say, there are totally three groups of exciting coil wire bundles. During working, a steady-state sinusoidal excitation current 6 flows into one bundle of exciting coil wires 2, then passes through the end of the columnar coil former, and flows out from the other bundle of exciting coil wires 2 in the same group.

Figure 4:
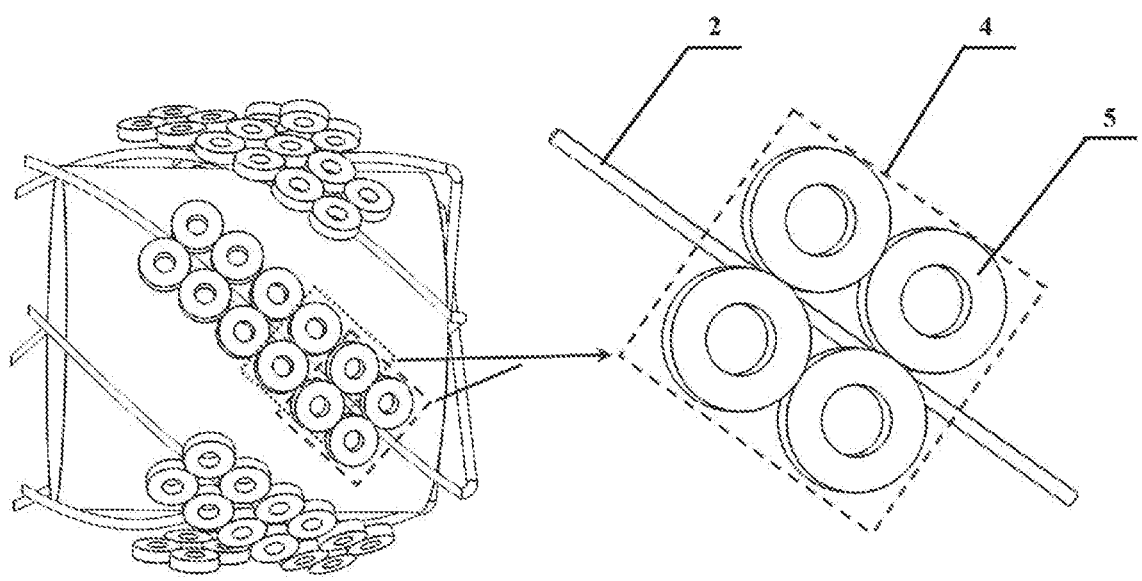
FIG. 4 is a structural sketch view of one differential eddy current testing pick-up unit of a pick-up coil part according to the present invention.

As shown in FIG. 4, each pick-up coil part consists of two rows of pancake coils 5 which are identical, and is distributed outside each bundle of exciting coil wires 2 helically with the lead angle of 45° as a whole; two adjacent pancake coils 5 in one row and two adjacent pancake coils 5 in same positions of the other row form one differential eddy current testing pick-up unit 4; in each differential eddy current testing pick-up unit 4, four pancake coils 5 are closely arranged in a square shape. During working, under each time of excitation, two pancake coils 5 respectively in same positions of the two rows successively form one differential eddy current testing pick-up unit 4 with the pancake coils 5 at two sides; that is to say, the pancake coils 5 not at two ends of each row are required to continuously work for two times.

A working principle of the present invention is described as follows. The present invention aims to realize detection and evaluation for tube wall defects of the tubular structure 1 to be detected.

Firstly, the steady-state sinusoidal excitation current 6 is applied to the exciting coil part; the steady-state sinusoidal excitation current 6 generates an alternating magnetic field, an eddy current is induced inside the tubular structure 1 to be detected, and the eddy current further induces a secondary magnetic field; a resultant magnetic field formed after superposing the two magnetic fields enables the two ends of each pancake coil 5 to generate the voltage signal; under influences of different defect forms inside the tubular structure 1 to be detected, the induced secondary magnetic field correspondingly changes, so as to generate the different voltage signals.

Next, an excitation process at each detection position includes three phases, that is to say, the steady-state sinusoidal excitation current 6 is successively applied to the three groups of exciting coil wire bundles in the exciting coil part; during excitation of each phase, each differential eddy current testing pick-up unit 4 outside the corresponding bundle of exciting coil wires successively generates a differential detecting signal; during each time of working, the four pancake coils 5 in each differential eddy current testing pick-up unit 4 all generate the detecting signal (the pancake coils 5 not at the two ends of each row continuously work for two times); through the difference calculation with the additions between the signals of the opposite pancake coils 5 and the subtractions between the signals of the adjacent pancake coils 5 in each differential eddy current testing pick-up unit 4, the detecting signal at a center of each differential eddy current testing pick-up unit 4 is obtained; the detecting signal carries the defect information and is able to effectively and simultaneously reduce the interferences of the external environment such as lift-off and probe inclination.

Finally, the columnar coil former 3 moves axially along the tubular structure 1 to be detected and drives the probe composed of the exciting coil part and the pick-up coil parts to axially scan the tubular structure 1 to be detected; through comparing the above detecting signal with a detecting signal of a non-defect tube, it is judged that whether defects exist in a current scanning area; if the defect signal exists, the current scanning area is scanned repeatedly, so as to determine the defect position.

What is claimed is:

1. A built-in S-typed array eddy current testing probe for detecting defects of a tubular structure, which is arranged inside the tubular structure (1) to be detected, comprising an exciting coil part and a plurality of pick-up coil parts, wherein: the exciting coil part comprises N bundles of exciting coil wires (2) helically wound on a same columnar coil former (3); on a cross section of the columnar coil former (3), the N bundles of exciting coil wires (2) are distributed with a same interval; two bundles of exciting coil wires (2) with an interval of 180° are connected at an end of the columnar coil former (3), actually being a same group of exciting coil wire bundles: that is to say, there are totally N/2 groups of exciting coil wire bundles; each pick-up coil part consists of two rows of pancake coils (5) which are identical, and is distributed outside each bundle of exciting coil wires (2) helically as a whole; two adjacent pancake coils (5) in one row and two adjacent pancake coils (5) in same positions of the other row form one differential eddy current testing pick-up unit (4); in each differential eddy current testing pick-up unit (4), four pancake coils (5) are closely arranged in a square shape; during detecting, an excitation current is successively applied to the N/2 groups of exciting coil wire bundles of the exciting coil part; under each time of excitation, each differential eddy current testing pick-up unit (4) outside a corresponding bundle of exciting coil wires successively generates a differential detecting signal, which is able to simultaneously and effectively reduce influences of an external environment of lift-off and probe inclination on detection results, thereby achieving a relatively high detection accuracy.

2. The built-in S-typed array eddy current testing probe for detecting the defects of the tubular structure, as recited in claim 1, wherein: the bundle number of exciting coil wires (2) in the exciting coil part is six; on the cross section of the columnar coil former (3), the six bundles of exciting coil wires (2) are distributed with a same interval of 60°; two bundles of exciting coil wires (2) with the interval of 180° are connected at the end of the columnar coil former (3), actually being the same group of exciting coil wire bundles; that is to say, there are totally three groups of exciting coil wire bundles.

3. The built-in S-typed array eddy current testing probe for detecting the defects of the tubular structure, as recited in claim 1, wherein: the N bundles of exciting coil wires (2) in the exciting coil part are helically wound on the columnar coil former (3) with a lead angle of 45°.

4. The built-in S-typed array eddy current testing probe for detecting the defects of the tubular structure, as recited in claim 1, wherein: the pancake coils (5) of each pick-up coil part are distributed outside each bundle of exciting coil wires (2) in a form of a helix with a lead angle of 45° as a whole; two pancake coils (5) respectively in same positions of the two rows are closely arranged in a direction vertical to a tangent of the helix.

5. The built-in S-typed array eddy current testing probe for detecting the defects of the tubular structure, as recited in claim 1, wherein: a final output signal of each pick-up coil part is a result of additions between signals of opposite pancake coils (5) and subtractions between signals of adjacent pancake coils (5) in each differential eddy current testing pick-up unit (4).

6. A method for detecting defects of a tubular structure with the built-in S-typed array eddy current testing probe as recited in claim 1, comprising steps of: firstly applying a steady-state sinusoidal excitation current (6) to the exciting coil part generating an alternating magnetic field by the steady-state sinusoidal excitation current, inducing an eddy current inside the tubular structure (1) to be detected, and further inducing a secondary magnetic field by the eddy current; by a resultant magnetic field formed after superposing the two magnetic fields, enabling two ends of each pancake coil (5) to generate a voltage signal; under influences of different defect forms inside the tubular structure (1) to be detected, the induced secondary magnetic field correspondingly changing, and generating different voltage signals;

wherein: an excitation process at each detection position includes three phases, that is to say that the steady-state sinusoidal excitation current (6) is successively applied to the N/2 groups of exciting coil wire bundles in the exciting coil part; during excitation of each phase, each differential eddy current testing pick-up unit (4) outside a corresponding bundle of exciting coil wires successively generates a differential detecting signal; during each time of working, the four pancake coils (5) in each differential eddy current testing pick-up unit (4) all generate detecting signals, wherein the pancake coils (5) not at two ends of each row continuously work for two times; through a difference calculation with additions between signals of opposite pancake coils (5) and subtractions between signals of adjacent pancake coils (5) in each differential eddy current testing pick-up unit (4), a detecting signal at a center of each differential eddy current testing pick-up unit (4) is obtained, wherein the detecting signal carries defect information and is able to simultaneously and effectively reduce interferences of an external environment of lift-off and probe inclination;

finally, the columnar coil former (3) moving axially along the tubular structure (1) to be detected and driving the probe composed of the exciting coil part and the pick-up coil parts to axially scan the tubular structure (1) to be detected; through comparing the detecting signal with a detecting signal of a non-defect tube, judging whether a defect exists in a current scanning area; if a defect signal exists, repeatedly scanning the current scanning area, and determining a position of the defect.

\* \* \* \* \*